Feb. 5, 1929.
C. H. DEREN
1,701,228
TIRE GAUGE
Filed July 11, 1927
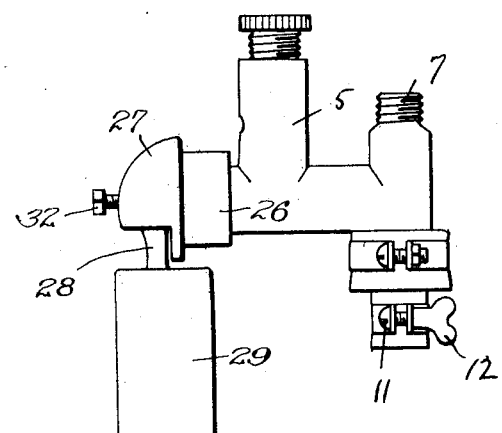
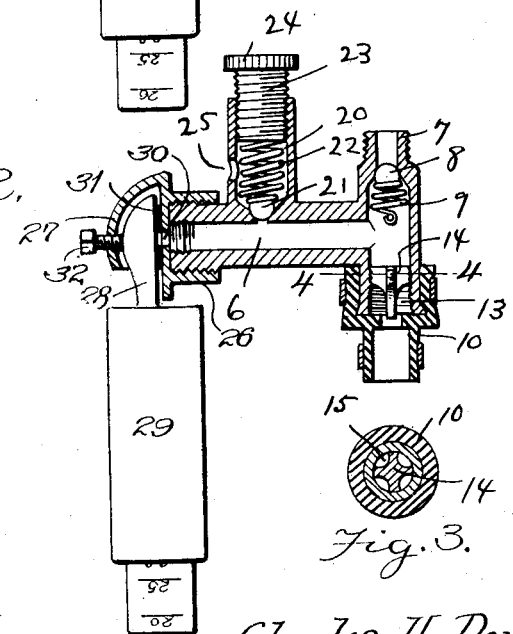
Inventor
Charles H. Deren
By Clarence A. O'Brien
Attorney Patented Feb. 5, 1929.

1,701,228

UNITED STATES PATENT OFFICE.

CHARLES HENRY DEREN, OF BROOKLYN, NEW YORK, ASSIGNOR TO OSCAR EDWARD TEPE, OF BROOKLYN, NEW YORK.

TIRE GAUGE.

Application filed July 11, 1927. Serial No. 204,897.

This invention relates to tire gauges and has for its principal object to provide an air chuck adapted to be secured to the valve stem of a pneumatic tire and having a connection formed thereon whereby to attach an air pressure hose communicating with either a hand operated pump or a motor driven pump and having means provided on the chuck whereby to attach a tire gauge thereto, thus enabling the chuck to be retained on the valve stem for inflating the tire and indicating the air pressure therein without necessitating the user to manually retain the chuck in position with respect to the stem during the inflating operation.

A further object is to provide a blow-off valve in the chuck adapted to be adjusted for operation under various pressures whereby to prevent the inflation of the tire beyond a predetermined pressure.

A still further object is to provide tire gauge attaching means for the chuck whereby to accommoate gauges having their air ports arranged either longitudinally with respect to the gauge or transversely thereof, such as required for the inflation of tires on certain types of wheels.

A further object is to arrange the air chuck with the various connections therefor in a simple and compact manner, efficient and reliable in performance, inexpensive to manufacture and otherwise well adapted for the purposes for which the same is intended.

Other objects and advantages reside in the special construction and combination of parts forming the invention, reference being had to the accompanying drawings forming a part hereof, wherein:

Figure 1 is an elevation view showing an air chuck with one form of tire gauge attached thereto.

Figure 2 is a similar view with the chuck shown in vertical section, and,

Figure 3 is a sectional view along a line 4—4 of Figure 2.

Referring to the drawing wherein for the purpose of illustration I have disclosed the preferred embodiment of my invention, I provide an air chuck 5 such as is commonly used for the inflation of pneumatic automobile tires, said chuck being of hollow construction throughout, whereby to form an air passage 6 extending therethrough and having a threaded air hose connection 7 communicating with the air passage 6 and to which may be securely attached the air hose leading to a hand operated air pump or a motor driven pump. A ball check valve 8 is arranged within the air hose connection 7 having a spring 9 adapted to normally retain the ball in position and yieldably permitting the ball to be forced inwardly by the pressure from the pump.

At the end of the chuck adjacent the air hose connection is arranged a coupling 10 for attaching the chuck to the valve stem of the tire, said coupling being formed of flexible material and sufficient elastic to form a tight fit upon the valve stem and provided with a clamp 11 and thumb nut 12 whereby to secure the coupling in position upon the valve stem during the inflating operation. An air passage extends laterally from the chuck through the coupling, the end of said air passage being internally threaded as indicated at 13 and adapted to threadedly receive a stem 14 constituting a plug and having a plurality of openings 15 extending therethrough permitting the free passage of the air from the chuck into the stem.

At the opposite end of the chuck is arranged a coupling 26 threaded on the end thereof, said coupling having an air port 30 extending therethrough and communicating with the air passage 6 in the chuck for directing the air pressure therein against the pressure responsive end of a tire gauge 29.

Between the ends of the chuck is interposed a pressure regulating valve constituting a valve chamber 20 extending laterally from the chuck and communicating with the air passage 6 therein and having a ball 21 normally closing the passage therebetween. The ball is tensionally held in position by a yieldable spring 22, the tension of which is adapted to be adjusted by a threaded plug 23 arranged within the end of the valve chamber 20. A knurled nut 24 is arranged on the outer end of the plug providing means for conveniently adjusting the plug. One side of the valve chamber 20 has an air discharge port 25 formed therein.

By adjusting the plug 23 so as to regulate the tension of the spring 22 in order to permit the opening of the valve at a predetermined pressure, the same may be thus set in advance of the inflating operation so that as soon as the desired pressure is obtained in the tire, the ball 21 will be moved from its seat thereby permitting the escape of further pressure through the ports 25.

The coupling 26 is provided with a dome 27 formed thereon with an opening in one side of, and within which may be inserted the stem 28 carried on the tire gauge 29, which stem is provided with a laterally extending air passage registering with the air passage 30 formed in the coupling 26. A rubber washer 31 may be interposed between the stem and the coupling to form a tight connection therebetween and a tightening screw 32 is carried by the dome engageable with the stem whereby to releasably secure the parts in attached position.

While I have shown and described a preferred embodiment of the invention, it is to be understood that I do not wish to be limited to the specific construction shown, since various changes may be made therein without departing from the spirit of the invention or the scope of the appended claim.

I claim:

In combination, a tubular chuck member having a plurality of openings formed therein and providing a connection for a valve stem and an air pressure hose, said chuck also having a threaded opening at one end, and a pressure gauge mounting adapted to form a threaded connection with said threaded opening in the chuck and comprising a cap member having a central opening formed therein, a dome mounted on the cap having one side open whereby to permit the insertion of a complementary stem of the tire gauge inwardly of the dome and a set screw carried by the dome and engageable with the insertable stem of the gauge for securing the same in assembled position.

In testimony whereof I affix my signature.

CHARLES HENRY DEREN.